United States Patent Office 3,506,574
Patented Apr. 14, 1970

3,506,574
LUBRICATING OILS AND FUELS CONTAINING
GRAFT COPOLYMERS
Robert L. Stambaugh, Hatboro, and Ronald D. Bakule,
Willow Grove, Pa., assignors to Rohm and Haas Company, Philadelphia, Pa., a corporation of Delaware
No Drawing. Filed Mar. 20, 1967, Ser. No. 624,158
Int. Cl. C10m 1/32; C10l 1/22
U.S. Cl. 252—51.5                                                   3 Claims

ABSTRACT OF THE DISCLOSURE

This invention concerns a method for preparing graft copolymers by grafting N-vinyl pyrrolidone onto a backbone containing a polymeric alkyl acrylate and/or alkyl methacrylate under polymerizing conditions and in the presence of an organic or inorganic free radical initiator. The invention further concerns lubricating oil compositions and hydrocarbon fuel compositions containing the graft copolymers. Imparted to lubricating and fuel compositions by the graft copolymers of this invention are such beneficial properties as dispersancy, improvements in viscosity, viscosity-temperature relationships, and pour point depressing action.

BACKGROUND OF THE INVENTION

This invention relates to a method for preparing graft copolymers having N-vinyl pyrrolidone branches on a trunk polymer or backbone containing a polymeric alkyl acrylate and/or alkyl methacrylate. A backbone is the chain onto which the monomer reactant is grafted. These graft copolymers are soluble in oils, whether of natural or mineral origin as from petroleum, and of synthetic nature and impart thereto improved properties. This invention further relates to lubricating oil compositions and hydrocarbon fuel compositions containing the graft copolymers which impart thereto outstanding dispersant properties. They may also impart other beneficial properties, including improvements in detergency, viscosity, viscosity-temperature relationships, and pour depressing action.

A need exists for oil-soluble dispersing agents which are free of inorganic components which give ash. Such agents may serve to disperse gums, resins, and sludges which form in internal combustion engines as a result of incomplete combustion of fuel and decomposition of lubricants. The dispersant enables the sludge to remain in suspension.

There is a particular need for ashless dispersants which are effective at low operating temperatures of gasoline and compression-ignition engines and under conditions of intermittent service. At the same time such a dispersant must withstand conditions of relatively high temperature operation. It must resist shear and oxidation and be compatible with other additives which are now required in oils, such as anti-oxidants, stabilizers, wear-resisting agents, other detergents, especially heavy duty detergents, anti-rust agents, pour point depressants, viscosity index improvers, anti-foam agents, or dyes. It would be desirable to have agents which can act not only as dispersants but also for one or more of the purposes of various other additives. It is desirable also to have dispersants which can be added to petroleum fuels, particularly to fuel oils from cracked distillates or fuel oils having an appreciable content of cracked distillates, and to jet fuels to disperse gums or resins which tend to form therein.

Economically, the most costly portion of these graft copolymers is the N-vinyl pyrrolidone component; therefore it is desirable to employ the smallest effective proportion of this monomer in the preparation of the graft copolymer and to utilize it in the most efficient manner. It is a unique feature of this invention that the particular graft process employed in preparing these copolymers enables the production of polymeric products containing a small amount of N-vinyl pyrrolidone and these graft polymers possess a greater degree of dispersancy power when compared to products containing the same or more N-vinyl pyrrolidone, but prepared by such processes as random copolymerization or by grafting an N-vinyl pyrrolidone onto a partially polymerized backbone. This increased dispersancy power may be observed when lubricating compositions containing the graft copolymers prepared by the process of this invention are engine tested in various types of internal combustion engines including both gasoline engines and engines consuming more viscous petroleum fractions such as crude oil. Particularly outstanding dispersancy results are obtained when lubricating compositions containing the graft copolymer prepared by the process of this invention are engine tested under endurance conditions.

SUMMARY OF THE INVENTION

The process of this invention relates to a method for preparing graft copolymers containing N-vinyl pyrrolidone by reacting (1) an N-vinyl pyrrolidone under polymerizing conditions in the presence of a polymerization catalyst which may be an inorganic or organic initiator with (2) an oil-soluble polymeric backbone prepared from at least one oil-soluble acrylic ester. The backbone polymer optionally contains a lower alkyl acrylic ester and/or, in minor amounts, another monoethylenically unsaturated compound. This grafting process enables the N-vinyl pyrrolidone to be utilized in the most efficient and economical manner. N-vinyl pyrrolidone graft copolymers produced by the method of this invention impart such desirable properties as dispersancy to lubricating oil compositions when the graft copolymer is employed in amounts of from about 0.1 to 10% by weight and to fuel compositions when the graft copolymer is employed in amounts of from about 0.001% to 0.1% by weight.

DESCRIPTION OF THE INVENTION

The desirable results of this invention are achieved by grafting with an organic or inorganic free radical initiator of from about 0.5% to about 15% by weight of the graft copolymer and preferably about 1% to about 4% by weight of graft copolymer of an N-vinyl pyrrolidone onto a backbone polymer containing at least one polymerized oil soluble acrylate and/or methacrylate.

Specifically the catalyzed grafting process of this invention using organic or inorganic free radical initiators, is employed to form polymeric products wherein an N-vinyl pyrrolidone is grafted onto a backbone containing at least one alkyl acrylate or alkyl methacrylate in which the alkyl group or groups are of sufficient size to ensure solubility of the copolymer in the particular liquid petroleum product in which the copolymer is incorporated. The backbone or base polymer may also contain moieties from other polymerizable monoethylenically unsaturated compounds than the acrylates and/or methacrylates supplying oil-solubility.

The method for preparing the graft copolymers of this invention comprises polymerizing, under the influence of a free radical generating catalyst, an N-vinyl pyrrolidone in the presence of a polymer prepared from at least one monoethylenically unsaturated ester having a hydrocarbon group imparting oil-solubility. The process of this invention may be practiced by first polymerizing the monomeric reactants comprising at least one oil soluble acrylate or methacrylate until the polymerization is substantially complete, i.e. there is at least a 90% and preferably 95% to 100% conversion of monomer to polymer, and then adding an N-vinyl pyrrolidone monomer under polymerizing conditions and in the presence of a polymerization catalyst to form the graft copolymer. The N-vinyl pyrrolidone monomer is contacted with the oil-soluble backbone polymer and the resulting reaction mixture is heated to a temperature in the range of from 60° to 225° C. and preferably from about 80° C. to about 160° C. for a period of from about 15 to 1400 or more minutes. The period or duration of polymerization will depend somewhat on the conditions of polymerization including the particular initiator(s) selected. Alternatively, a preformed oil-soluble polymer containing at least one acrylate or methacrylate may be dispersed in a suitable medium followed by addition of an N-zinyl pyrrolidone under appropriate polymerizing conditions to form the graft copolymer. The N-vinyl pyrrolidone graft copolymers of this invention range in average molecular weights from about 5,000 to 2,000,000. The intrinsic viscosity of these graft copolymers may vary from about 0.03 to about 2.0 as determined in toluene at 30° C.

N-vinyl pyrrolidones that may be used in the grafting process of this invention may be represented by the structural formula

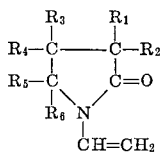

wherein $R_1$, $R_2$, $R_3$, $R_4$, $R_5$ and $R_6$ are independently selected from the group consisting of hydrogen and lower alkyl. Preferred lower alkyl groups contain from 1 to 4 carbon atoms.

Representative N-vinyl pyrrolidones within the scope of the above formula that are useful include N-vinyl pyrrolidone itself, 3-methyl-1-vinyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 4,5-dimethyl-1-vinyl pyrrolidone, 5,5-dimethyl-1-vinyl pyrrolidone, 3,3,5-trimethyl-1-vinyl pyrrolidone, 4-ethyl-1-vinyl pyrrolidone, 5-methyl-5-ethyl-1-vinyl pyrrolidone, 3,4,5 - trimethyl-3-ethyl-1-vinyl pyrrolidone, and other lower alkyl substituted N-vinyl pyrrolidones.

Also, within the scope of this invention are other cyclic N-vinyl amides such as N-vinyl caprolactam and its alkyl-substituted derivatives that may be co-grafted onto the oil-soluble polymeric backbone.

The backbone of the graft copolymer is based primarily, i.e. at least 30%, upon alkyl acrylates or alkyl methacrylates with alkyl groups of sufficient average size to ensure solubility of the graft copolymer in the particular petroleum liquid product employed. Oil-soluble acrylic esters useful for forming the base polymer may be represented by the formula

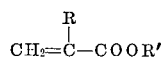

wherein R represents hydrogen or methyl and R' represents an oil solubilizing group, especially an alkyl group of 8 to 24 carbon atoms. The alkyl group may be a straight chain or branched chain and preferably contains 12 to 18 carbon atoms. Representative acrylic and methacrylic esters that promote oil solubility comprise octyl, decyl, isodecyl, dodecyl, isododecyl, myristyl, cetyl, stearyl, eicosyl and tetracosyl acrylates and methacrylates. The term "acrylic ester" in this invention includes both acrylates and methacrylates. Mixtures of both alkyl acrylates and alkyl methacrylates may be used.

Lower alkyl acrylic esters, here meaning esters having alkyl groups smaller than eight carbon atoms and derived from acrylic or methacrylic acid, are of particular interest, because in general they possess polymerizing characteristics smilar to the acrylic esters which supply oil-solubility. Presence of small alkyl groups in copolymers may help improve such properties as pour point depression and viscosity index improvement. Typical lower acrylic esters are methyl, ethyl, propyl, butyl, amyl, and hexyl acrylates and methacrylates. These lower alkyl acrylic esters may be employed in amounts ranging from 0 to 65%.

In addition to the one or more of the above acrylic esters possessing oil-solubilizing groups and the aforementioned lower alkyl acrylic esters, there may be used to form the backbone, in minor amounts, one or more other miscellaneous free radically polymerizable monoethylenically unsaturated compounds, particularly monovinylidene compounds, i.e., those have one $CH_2=C<$ group.

These include alkyl esters of maleic, fumaric, and itaconic acids (including half esters thereof), acrylic acid, methacrylic acid, maleic acid, fumaric acid, itaconic acid, maleic anhydride, acrylic amides, maleic half amides, acrylonitrile, methacrylonitrile, vinyl alkyl ethers, vinyl alkyl thioethers, styrene, alkylstyrenes, and lower alkyl acrylic esters.

The hydrocarbon groups in other esters and in ethers may be small or large. Alkyl groups may range from methyl through butyl, octyl, nonyl, and dodecyl to octadecyl and mixtures. Half esters of dicarboxylic acids are of interest in supplying both the ester function and the acid function, which is often desired and which can be converted to a salt form, as with barium, strontium, calcium, or magnesium. Such miscellaneous comonomers are used in minor proportions and in amounts which do not interfere with oil-solubility of the final copolymer. Of course, those having larger hydrocarbon groups may also assist in imparting oil-solubility.

In a similar way, there may be used in minor proportion polymerizable esters in which in place of an alkyl group there may be used a cycle-containing residue of an alcohol or ester-forming equivalent, typical whereof are phenyl, alkylphenyl, benzyl, cyclohexyl, alkylcyclohexyl, cyclopentyl, and dicyclopentyl. Similarly, the alcohol residue used for forming a polymerizable ester or ether may contain a heteroatom, including oxygen, sulfur, nitrogen, halogen, or phosphorus. Typical of these groups are methoxyethyl, ethoxyethoxyethyl, methylthiomethyl, butoxyethyl, ethoxypropyl, methylthioethyl, chloropropyl, 4-chlorobutyl, butoxybuty, phenoxyethyl, octylphenoxyethyl, butylphenoxyethoxyethoxyethyl, alkyloxypolyethoxyethyl in which there are up to 30 or more ether groups, cyclohexoxypropyl, benzoxyethyl, dodecylthioethoxyethyl, 2-(ethylsulfinyl)ethyl, butylsulfinylethyl, phenylsulfinylmethyl, dimethylaminoethyl, dibutylaminoethyl, tert-butylaminoethyl, dimethylaminoethoxyethyl, diethylphosphatoethyl, or diethylphosphonomethyl. Heteroatom-containing groups often help supply one or more interesting properties to the final copolymer.

Typical vinyl ethers are vinyl butyl ether, vinyl octyl ether, vinyl dodecyl ether, vinyl hydroxyethyl thioether, and vinyl tetradecyl thioether. In place of vinyl alkyl ethers there may be used vinyl ethers having a ring substituent as in vinyl phenyl ether, vinyl benzyl ether, or vinyl cyclohexyl ether.

Polymerizable amides of chief interest are acrylamide, methacrylamide, and their N-substituted derivatives, including such compounds as N-methyl, N-dimethyl, N-octyl, N-dodecyl, N-cyclohexyl, N-phenyl, N-methyl-N-benzyl, N-butoxymethyl, N-(dimethylaminoethyl), or N-β-cyanoethyl acrylamide or methacrylamides.

Usually the monomer or monomers from the above miscellaneous types are mixed with the acrylic and/or methacrylic ester or esters forming the backbone. Usually from about 0% to about 25% based on the weight of the final copolymer of such miscellaneous monomer or monomers may be used, if desired, but such use is optional. For the successful preparation of oil-soluble copolymers having dispersing action the chief source of moieties must be from one or more acrylic and/or methacrylic esters which form a base polymer onto which the later added N-vinyl pyrrolidone is copolymerized. The miscellaneous monomers serve as extenders and modifiers.

To prepare graft copolymers having dispersing activity in oils, the backbone containing at least one acrylic and/or methacrylic ester supplying oil-solubility, with or without other polymerizable monoethylenically unsaturated compounds, is treated with a free radical polymerization initiator. Standard techniques that are conventional in the art may be employed to prepare the base polymer. This initiator may be an organic peroxide or hydroperoxide or an azo catalyst. An especially effective initiator system comprises an anorganic hydroperoxide coupled with a quaternary ammonium compound as activator. Graft polymerization may be effected in bulk or in an organic solvent, especially in an organic solvent in which polymers are soluble. Use of such solvent decreases viscosity of the mixture and permits a more efficient polymerization reaction.

Among solvents which may desirably be used are aromatic hydrocarbons, such as benzene, toluene, xylene, and aromatic naphthas, chlorinated hydrocarbons such as ethylene dichloride, esters such as ethyl propionate or butyl acetate, and also petroleum oils which are pure enough so as not to interfere with polymerization. Solvent may be retained with the final polymer or it may be removed therefrom. When the graft copolymer is to be used in a lubricating composition, the final copolymer in solvent may be mixed with a good quality mineral oil, such as 100 to 150 neutral oil, or with a synthetic lubricant and the volatile solvent evaporated from the mixture to give a solution of copolymer in oil or synthetic lubricant, such as dioctyl sebacate, dibutylphenyl phosphate, a silicate ester, or a silicone fluid.

The N-vinyl pyrrolidone monomer is heated with initiator in the presence of the backbone polymer to a polymerizing temperature between about 60° and 225° C. Choice of temperature or range of temperature depends in part upon the initiator system to be used and upon such other factors as choice of monomer, solvent, and concentrations. Graft polymerization may be initiated at one temperature and continued at other temperatures. Initiator or initiator and activator may be added in portions. Different polymerization initiators may be used at different stages of polymerization, during which solvent may be supplied or removed.

As initiator there is preferably used an organic hydroperoxide such as tert-butyl hydroperoxide, cumene hydroperoxide, diisopropylbenzene hydroperoxide, p-menthane hydroperoxide, pinane hydroperoxide, 2,5-dimethylhexane-2,5-dihydroperoxide, or other tert-alkyl hydroperoxide, hydrocarbon-substituted benzene hydroperoxide, or terpene hydroperoxide. The initiator may be supplied as a single charge or added in portions as polymerization progresses.

Hydroperoxides become active as initiators at lower temperatures when used in conjunction with an activator. Especially useful activators are quaternary ammonium compounds, such as benzyltrimethylammonium chloride,
dibenzyldimethylammonium bromide,
butyldimethylbenzylammonium chloride,
cetyltrimethylammonium chloride,
dodecyldimethylbenzylammonium chloride,
dodecylbenzyldimethylbenzylammonium chloride,
didodecenyldimethylammonium chloride,
benzyldimethyldodecenylammonium chloride,
octylphenoxyethyldimethylbenzylammonium chloride,
nonylphenoxyethoxyethyltrimethylammonium chloride,
diisobutylphenoxyethoxyethyldimethylbenzylammonium chloride,
cetylpyridinium bromide,
N-octyl-N-methylmorpholinium chloride, and bis-quaternary ammonium salts, such as those having quaternary nitrogens linked with an alkylene chain, an amide-containing chain, or an ether-containing chain.

In place of a hydroperoxide or a hydroperoxide-activator system there may be used other free radical polymerization initiators. These include peroxides such as benzoyl peroxide, acetyl peroxide, caproyl peroxide, lauroyl peroxide, di-tert-butyl perphthalate, tert-butyl perbenzoate, 2,2-bis(tert-butyl-peroxy)butane, or methyl ethyl ketone peroxide. There may likewise be used an azo catalyst such as azodiisobutyronitrile, azobisdimethylvaleronitrile, azodiisobutyramide, dimethyl azodiisobutyrate, azobis($\alpha$-ethylbutyronitrile), or azobis($\alpha,\beta$-dimethylcapronitrile).

The amount of initiator or initiators is usually between about 0.01% and about 5% of the weight of monomers used.

The compositions of the present invention are produced by incorporating from about 0.001% to 10% by weight of at least one of the above-described N-vinyl pyrrolidone graft polymers in the oil or fuel base contemplated. For lubricant formulations, the polymers of the present invention are used in the amounts of 0.1% to 10.0%, preferably 0.2% to 4.0% by weight. In fuels, the range is 0.001% to 0.1%, preferably 0.005% to 0.0% by weight.

The compositions of the present invention possess the advantageous combination of a high degree of effectiveness with respect to dispersant-detergent properties, pour-point depressing action and viscosity improvements.

The following describes some of the tests employed in evaluating the valuable compositions of the present invention:

DISPERSANCY TEST

A method for determining the dispersing activity of any given polymer is based on the capacity of the polymer to disperse asphaltenes in a typical mineral oil.

The asphaltenes are obtained oxidizing a naphthenic oil with air under the influence of a trace of iron salt as catalyst, such as ferric naphthenate. The oxidation is desirably accomplished at 175° C. for 72 hours by passing a stream of air through a naphthenic oil. Pentane is added to the cooled, oxidized oil to form a sludge which may be separated by centrifuging. The sludge is freed from oil by extracting it with pentane. It is then taken up with chloroform and the resulting solution is adjusted to a solids content of about 2% (wt. per vol.).

When a polymer is to be examined for its dispersing activity, it is dissolved in a standard oil, such as a solvent- extracted 100 neutral. Blends may be prepared to contain percentages varying from about 2% to 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at 150° C. for 2 hours to drive off volatile material. The tube is then allowed to cool and the appearance of the sample is noted.

If the polymer has dispersing activity, the oil will appear clear although colored.

Experience has demonstrated that, unless a polymer exhibits dispersing activity at concentrations below about 2% in the above test, it will fail to improve the cleanliness of engine parts in actual engine tests.

API SERVICE MS SEQUENCE V-A TEST

This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race Street, Philadelphia 3, Pa.

The engine may be rated at any time during the course of the test. The 7 parts rated for sludge (CRC Merit, 10-clean) are the rocker arm assembly, rocker arm cover plate, valve deck, timing gear cover, push rod cover plate, push rod chamber and oil pan.

PANEL COKER TEST

This test is described in the record of the Fifth World Petroleum Congress (1959) in an article by R. M. Jolie, "Laboratory Screening Test for Lubricating Oil," Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

SUNDSTRAND PUMP TEST

In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed. (Nelson, Osterhaut and Schwindeman, Ind., Eng. Chem. 48, 1892 (1956).)

As will be clearly understood in the art, the fuels contemplated are distillate fuels that boil from 75° to 750° F. which includes gasolines, along with jet and diesel fuels and furnace oils. The present compounds are particularly useful in fuels that boil up to about 600° F., that is, the normal gasolines and jet fuels.

Lubricating compositions of this invention may be based on mineral oils or on synthetic lubricants. The mineral oils may vary over a wide range of viscosity, such as 1 to 25 centistokes at 210° F. These oils may be of naphthentic or paraffinic nature or may be of various mixtures. They maye be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or isodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one or more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium, or nickel dialkyldithiophosphate, sulfurized oils, such as sulfurized sperm oil and sulfurized terpenes, alkylphenol sulfides, alkylaryl sulfonates, petroleum sulfonates whether normal or with alkaline reserve, such as calcium, barium or strontium petroleum sulfonates, polymers and copolymers from alkyl acrylates, methacrylates, itaconates, or fumarates or vinyl carboxylates and mixtures thereof, copolymers of acrylic esters and polar monovinylidene compounds, such as N-vinyl-2-piperazinone, vinylpyridines, aminoalkyl acrylates or methacrylates, or polyethyleneglycol, acrylic esters, polybutenes, alkylphenol-alkylene oxide condensates, alkenylsuccinic anhydrides, various silicones and alkyl or aryl phosphates, such as tricresyl phosphates. There may also be used 4,4'-methylenebis-2,6-di-tert-butylphenol, trialkylphenols, tris-(dimethylaminomethyl)phenol, phenothiazine, naphthylamines, N'-sec-butyl-N,N-dimethyl-p-phenylenediamine, alkaline earth alkylphenates, alkaline earth salicylates, calcium phenylstearate, alkylamines, especially $C_{12}$–$C_{24}$ alkylamines, cyclic amines, alkyl and aryl imidazolines and alkenyl succinic anhydrides reacted with amines and then with boron compounds, such as boron oxides, boron halides and boron esters.

While a pour-point depressant and a viscosity index improver may be added in addition to a copolymer of this invention, there may be used in place of such separate additives a copolymer of this invention which supplies not only dispersant action, but also one or both of these other actions. Thus, a copolymer of an ester described hereinbefore, which contains some alkyl groups of 16 or more carbon atoms, particularly cetyl or stearyl together with smaller groups, such as myristyl, lauryl or octyl, will lower the pour point of oils having a waxy pour-point and at the same time improve temperature-viscosity relationships. Improvements in viscosity index can be emphasized by the choice of substituents and such improvements can be had without lowering of pour-point if this is desired.

To assist those skilled in the art to practice the present invention, the following modes of operation are suggested by way of illustration, parts and percentages being by weight and the temperatures in ° C. unless otherwise specifically noted.

Example 1

A solution was prepared from 270 parts of laurylmyristyl methacrylate, 40 parts of white mineral oil, 0.5 part of a solution of 50% diisopropylbenzene hydroperoxide in n-hexanol, and 0.05 part of n-dodecyl mercaptan. Thirty percent of this solution, 40 parts of white mineral oil, and 0.05 part of an n-hexanol solution of 25% diisobutylphenoxyethoxyethyl benzyl dimethylammonium chloride were charged to a reaction vessel equipped with a stirrer, reflux condenser, nitrogen inlet tube and hot oil bath. The solution was stirred under a nitrogen atmosphere and when it was heated to 105° C. polymerization began. After the initial exotherm carried the temperature to about 125° C., the reaction temperature was maintained at 115° ±3° C. At the completion of the initial exotherm, the remaining seventy percent of the monomeric mixture was added during 1.67 hours. Three separate additions of 0.25 part of a 50% solution of diisopropylbenzene hydroperoxide in n-hexanol and 0.025 part of a 25% solution of diisobutylphenoxyethoxyethyl benzyl ammonium chloride in n-hexanol were added at reaction times of 2.67; 3.33 and 4.0 hours. An aliquot of 5 parts was removed and analyzed for polymer content by precipitation into methanol. The polymer found corresponded to a polymerization yield of 96%.

To the remaining polymeric solution, continuously stirred and heated at 115° C., was added 5.4 parts of N-vinylpyrrolidone, and at 5, 45 and 85 minutes thereafter separate additions of 0.25 part of a 50% solution diisopropylbenzene hydroperoxide in n-hexanol and 0.025 part of 25% diisobutylphenoxyethoxyethyl benzyl ammonium chloride in n-hexanol were made. Forty minutes after the last initiator addition, the batch was cooled and diluted with mineral oil to a 40% polymer content, based on an additional analysis by precipitation.

Example 1A

A blend containing 5.5 parts of this concentrate in 94.5 parts of a 100 VI 170 SUS neutral oil had viscosities of 11.05 cst. at 210° F. and 68.19 cst. at 100° F. with a viscosity index (ASTM D–567) of 139.

In the Panel Coker Test, a blend containing 2.5% of the above concentrate gives a deposit weight of 68 mg. The same oil without the additive gives a deposit weight of 285 mg.

In the Sundstrand Pump Test at .01 gram in 100 ml. of oil, the weight of sludge is 38 mg., while the oil without any additive gives 220 mg.

In the standard asphaltenes test 1.0% of the copolymer disperses 0.4% of asphaltenes at 150° C.

Example 2

Two hundred seventy parts of laurylmyristyl methacrylate was polymerized in white mineral oil to a 97% yield, according to the procedure described in Example #1. To this polymeric oil solution was then added, with continued stirring and heating at 115° C. in a nitrogen atmosphere, 11.2 parts of N-vinylpyrrolidone followed by three initiator additions exactly as given in Example #1. Forty minutes after the last initiator addition the batch was cooled and diluted with mineral oil to 40% polymer content, based on analysis by precipitation.

Example 2A

A blend containing 4.75 parts of this concentrate in 95.25 parts of a 100 VI 170 SUS neutral oil had viscosities of 10.98 cst. at 210° F. and 770.50 cst. at 100° F. with a viscosity index (ASTM D–567) of 136.

In the Panel Coker Test, a blend containing 2.38% of the above concentrate gives a deposit weight of 109 mg. The same oil without the additive gives a deposit weight of 285 mg.

In the Sundstrand Pump Test at 0.01 gram in 100 ml. of oil, the weight of sludge is 4 mg., while the oil without any additive gives 220 mg.

In the standard asphaltenes test 0.25% of the copolymer disperses 0.4% of asphaltenes at 150° C.

2.43 parts of the above concentrate is blended with 1.00 part of a commercial zinc dialkyl dithiophosphate into 96.57 parts of a 170 SUS Mid-Continent Solvent Extracted Neutral Oil. The viscosity of this blend is 8.07 cst. at 210° F. and 51.48 cst. at 100° F. with a viscosity index of 129. The ASTM pour point is −25° F. This blend is evaluated in the Sequence V–A test giving a sludge rating at the end of 75 hours of engine operation of 69.1 (70.0=clean). The value for the reference oil alone is 39.7.

Example 3

A polymer of lauryl-myristyl methacrylate was prepared from 270 parts of the monomer in 80 parts of white mineral oil, according to the procedure in Example #1. The polymer yield was 98.6%. To this polymer-oil solution, stirred and heated at 115° C. under an atmosphere of nitrogen, was added 23.5 parts of N-vinylpyrrolidone over a 30 minute period, followed thereafter by the three initiator additions at 5, 45 and 85 minutes as indicated in Example #1. Forty minutes after the last initiator addition the slightly cloudy solution was cooled and diluted to 40% polymer content with mineral oil.

Example 3A

A blend containing 3.7 parts of this concentrate in 96.3 parts of a 100 VI 170 SUS neutral oil had viscosities of 11.06 cst. at 210° F. and 68.44 cst. at 100° F. with a viscosity index (ASTM D–567) of 139.

In the standard asphaltenes test 0.125% of the copolymer disperses 0.4% asphaltenes at 150° C.

Example 4

A mixture of 60.7 parts of a polymer of lauryl-myristyl methacrylate, 4.4 parts of isooctane and 5.3 parts of N-vinplpyrrolidone was heated in a reaction flask, under a nitrogen atmosphere, at 100° C. until complete solution was effected. The solution was then maintained at 100° C. and, with stirring, 0.4 part of a solution of 2.42 parts of benzoyl peroxide in 16 parts of benzene was added. Thereafter, with continued heating and stirring, separate additions of 0.2 part of this same initiator solution were made every twenty minutes until the reaction was terminated at 5.5 hours. The polymeric product was obtained by precipitation of the reaction solution into methanol.

Example 4A

The above product was dissolved in benzene and then stripped from the volatile solvent into a 150 SUS neutral oil to form a concentrate containing 37.5% polymer.

A blend containing 4.16 parts of this concentrate in 95.84 parts of a 100 VI 170 SUS neutral oil had viscosities of 11.01 cst. at 210° F. and 67.74 cst. at 100° F. with a viscosity index (ASTM D–567) of 139.

In the standard asphaltenes test 0.0625% of the copolymer disperses 0.4% of asphaltenes at 150° C.

2.67 parts of the above concentrate is blended with 1.0 part of a commercial zinc dialkyl dithiophosphate into 96.33 parts of a 170 SUS Mid-Continent Solvent Extracted Neutral Oil. The viscosity of this blend is 8.54 cst. at 210° F. and 52.85 cst. at 100° F. with a viscosity index of 133. The ASTM pour point is −25° F. This blend is evaluated in the Sequence V–A test giving a sludge rating at the end of 75 hours of engine operation of 63.0 (70.0=clean). The value for the reference oil alone is 39.7.

Example 5

A mixture of 94 parts of a polymer of lauryl-myristyl methacrylate and 140 parts of isooctane was heated in a reaction flask at 85° C. until the polymer had completely dissolved. N-vinylpyrrolidone (8.8 parts) was then added and the entire reaction solution was deoxygenated by bubbling in helium gas for 30 minutes. With continuous stirring and heating of the reaction solution at 85° C., 3.0 parts of a initiator solution (prepared by dissolving 2.5 parts of benzoyl peroxide in 15 parts of benzene) was added. Thereafter, 0.9 part of this same initiator was added each hour until the reaction was terminated at 5.5 hours. The polymeric product was then isolated from the cloudy reaction mixture by precipitation of the mixture into methanol and drying of the polymer at 60° C. under vacuum.

Example 5A

In the standard asphaltenes test 0.0625% of the copolymer disperse 0.2% asphaltenes at 90° C., while 0.25% of the copolymer disperse 0.4% of asphaltenes at 150° C.

Example 6

The following components were mixed into solution at room temperature:

| | Parts |
|---|---|
| Cetyl-stearyl methacrylate | 39.4 |
| Lauryl-myristyl methacrylate | 26.9 |
| n-Butyl methacrylate | 32.1 |
| Methyl methacrylate | 5.0 |
| 150 neutral oil | 5.0 |
| n-Dodecyl mercaptan | 0.30 |
| 50% diisopropylbenzene hydroperoxide solution in n-hexanol (solution A) | 0.30 |

Thirty percent of this solution was charged to a reaction vessel containing 10.0 parts of 150 neutral oil and 0.06 part of a 25% solution of diisobutylphenoxyethoxyethyl benzyl ammonium chloride in n-hexanol (solution B). The entire solution was heated under a nitrogen atmosphere, with stirring, to 115° C. At this point polymerization began and the temperature was carried to 125° by the exotherm. After about 20 minutes the temperature was brought back to 115° and held at this point throughout the remainder of the process. As soon as the temperature had moderated at 115°, the remaining 70% of the monomer solution was added over a 1.67 hour period. Further additions were made as follows: at 2.67 hours of reaction time, 0.06 part of solution A, 0.006 part of the mercaptan, 0.012 part of solution B and 5.0 parts of the oil; at 3.33 hours, 0.09 part of solution A, 0.009 part of mercaptan, 0.018 part of solution B and 5.0 parts of oil. At 3.67 hours, the polymerization was essentially complete, based on analysis by precipitation. To this backbone copolymer solution was then added a mixture of 3.0 parts of N-vinylpyrrolidone and 0.54 part of solution A over a two-hour period. Subsequent additions were made as follows:

Time:
 3.75 hours—0.054 part of solution B; 0.6 part of 150 neutral oil
 5.75 hours—0.54 part of solution B; 0.60 part of 150 neutral oil
 7.67 hours—0.27 part of solution A; 0.054 part of solution B; 5.0 parts of 150 neutral oil At 8.33 hours, the reaction mixture was diluted with 55 parts of 150 neutral oil, and cooled. The final product when diluted to 26.5% polymer content in 150 neutral oil had a viscosity of 185 centistokes at 210° F.

Example 7

A product corresponding to that in Example #6, but at a higher backbone molecular weight, was made by the procedure in Example #6 using 5.0 parts of oil in the reaction vessel instead of 10.0 parts of oil. The final product, when diluted to 26.5% polymer content in 150 neutral oil, had a viscosity of 1102 centistokes at 210° F.

Example 7A 27.7 parts of the product of Example 6 prior to final dilution was combined with 27.7 parts of the above product prior to final dilution and 44.6 parts of 150 neutral oil. The resulting concentrate contained 26.5% copolymer and had a viscosity of 742 cst. at 210° F.

9.4 parts of the above concentrate is blended with 1.0 part of a commercial zinc dialkyl dithiophosphate into 89.6 parts of a 170 SUS Mid-Continent Solvent Extracted Neutral Oil. The viscosity of this blend is 13.45 cst. at 210° F. and 70.08 cst. at 100° F. with a viscosity index of 150. The ASTM pour point is −25° F. This blend is evaluated in the Sequence V–A test giving a sludge rating at the end of 75 hours of engine operation of 69.1 (70.0=clean). The value for the reference oil alone is 39.7.

6.0 parts of the above concentrate is blended with 1.0 part of a commercial zinc dialkyl dithiophosphate, 2.2 parts of a commercial ashless dispersant, 2.0 parts of a commercial basic sulfonate into 88.6 parts of a 170 SUS Mid-Continent Solvent Extracted Neutral Oil. The viscosity of this blend is 10.96 cst. at 210° F. and 63.00 cst. at 100° F. with a viscosity index (ASTM D-567) of 144. The ASTM pour point is −30° F. This blend is evaluated in the modified Caterpillar L–1 (S–1) Test. This test is made in a single cylinder Caterpillar engine equipped with new pistons, rings and liners, operating for 480 hours at 1000 r.p.m. at an average load of 19.2 B.H.P. with an oil sump temperature of 147° to 149° F. The fuel employed contains 1% sulfur. The test is designed to measure oil detergency. In the modified test, the engine is run without oil changes. Oil additions are made to maintain oil level. Inspections of the engine are made periodically. At the end of 448 hours of engine operation, inspection revealed 18% top groove filling and piston lacquer was rated a pass.

Example 8

A graft copolymer was prepared according to the procedure in Example #6 by polymerizing 5.0 parts of N-vinylpyrrolidone onto a backbone copolymer made from 31.0 parts of cetyl-stearyl methacrylate, 50.2 parts of lauryl-myristyl methacrylate and 13.8 parts of butyl methacrylate. The final product was diluted to 36.0% polymer content in neutral oil.

Example 8A

A blend containing 4.41 parts of this concentrate in 95.59 parts of a 100 VI 170 SUS neutral oil had viscosities of 11.08 cst. at 210° F. and 66.38 cst. at 100° F. with a viscosity index (ASTM D–567) of 141.

In the standard asphaltenes test 0.125% of the product copolymer disperses 0.4% of asphaltenes at 150° C.

Example 9

A graft copolymer was prepared according to the procedure in Example #6 by polymerizing 9.5 parts of N-vinylpyrrolidone onto a backbone copolymer made from 35.0 parts of cetylstearyl methacrylate, 30.5 parts of isodecyl methacrylate and 25.0 parts of butyl methacrylate. The final product was diluted to 28.5% polymer with 100 neutral oil.

Example 9A

A blend containing 4.35 parts of this concentrate in 95.65 parts of a 100 VI 170 SUS neutral oil had viscosities of 11.08 cst. at 210° F. and 62.88 cst. at 100° F. with a viscosity index (ASTM D–567) of 145.

In the standard asphaltenes test 0.125% of the product copolymer disperses 0.4% of asphaltenes at 150° C.

Example 10

A graft copolymer was prepared according to the procedure in Example #6 by polymerizing 9.5 parts of N-vinylpyrrolidone onto a backbone copolymer made from 290 parts of cetylstearyl methacrylate, 48.0 parts of lauryl-myristyl methacrylate and 25.0 parts of butyl methacrylate. The resulting product was diluted with 150 neutral oil to 33.4% polymer content.

Example 10A

In the standard asphaltenes test, 0.125% of the product copolymer disperses 0.4% of asphaltenes at 156° C.

2.87 parts of the above product is blended with 1.0 part of a commercial zinc dialkyl dithiophosphate into 96.13 parts of a 170 SUS Mid-Continent Solvent Extracted Neutral Oil. The viscosity of this blend is 7.32 cst. at 210° F. and 45.95 cst. at 100° F. with a viscosity index of 126. The ASTM pour point is −30° F. This blend is evaluated in the Sequence V–A test giving a sludge rating at the end of 75 hours of engine operation of 66.0 (70.0=clean). The value for the reference oil alone is 39.7.

Example 11

A backbone copolymer was prepared according to the procedure in Example #6 from 145.8 parts of cetylstearyl methacrylate, 93.0 parts of lauryl-myristyl methacrylate and 41.1 parts of butyl methacrylate. To this polymer solution, stirred at 105° under a nitrogen atmosphere, was added 28.5 parts of N-vinylpyrrolidone over a 5-hour period. Initiator additions of 0.15 part of benzoyl peroxide in 2.0 parts of toluene were made at the following times: 0.75 hour, 1.5 hours, 2.25 hours, 3.0 hours, 3.75 hours, 4.5 hours, 5.25 hours and 6 hours. At the end of 7.5 hours, the batch was diluted with oil to a 36% polymer concentration and cooled.

Example 11A

A blend containing 4.8 parts of this concentrate in 95.2 parts of a 100 VI 170 SUS neutral oil had viscosities of 11.07 cst. at 210° F. and 66.03 cst. at 100° F. with a viscosity index (ASTM D–567) of 141.

In the standard asphaltenes test 0.0625% of the copolymer disperses 0.4% of asphaltenes at 150° C.

In the Sundstrand Pump Test at 0.01 gram in 100 ml. of oil, the weight of sludge is 77 mg., while the oil without any additive gives 225 mg.

Example 12

A backbone copolymer was prepared according to the procedure in Example #6 from 81.2 parts of cetyl-stearyl methacrylate, 180 parts of isodecyl methacrylate and 22.8 parts of butyl methacrylate. To this polymer solution, stirred and heated to 125° C. under a nitrogen atmoshpere was added 28.5 parts of N-vinylpyrrolidone over a six hour period. At the beginning of this addition there was added 1.48 parts of a 70% solution of tertiary butyl hydroperoxide in propylene glycol. At 4.0 hours of reaction, another 1.48 parts of this same solution was added. After a total of twelve hours reaction time, the solution was cooled and diluted to 36% polymer content.

Example 12A

A blend containing 5.34 parts of this concentrate in 94.64 parts of a 100 VI 170 SUS neutral oil had viscosities of 11.04 cst. at 210° F. and 66.88 cst. at 100° F. with a viscosity index (ASTM D–567) of 140.

In the standard asphaltenes test, 0.125% of the copolymer disperses 0.4% of asphaltenes at 150° C.

Example 13

A backbone copolymer was prepared according to the procedure in Example #6 from 81.2 parts of cetyl-stearyl methacrylate, 180 parts of isodecyl methacrylate and 22.8 parts of butyl methacrylate. To the oil solution of this copolymer, stirred and heated at 140–160° under a nitrogen atmosphere, there was added 28.5 parts of N-vinylpyrrolidone over a six-hour period. At the beginning of the addition 1.59 parts of cumene hydroperoxide was added. After twelve hours of reaction, another 1.59 parts of cumene hydroperoxide was added, and the stirring and heating continued for a total of twenty hours. The batch was cooled and diluted to 36% polymer in oil.

Example 13A

A blend containing 8.18 parts of this concentrate, and 91.82 parts of a 100 VI 170 SUS oil had viscosities of 11.01 cst. at 210° F. and 68.34 cst. at 100° F. with a viscosity index (ASTM D–567) of 138.

In the standard asphaltenes test, 0.5% of the copolymer disperses 0.4% of asphaltenes at 150° C.

What is claimed is:

1. A composition comprising (1) a major portion of a member selected from the group consisting of a lubricating oil and a normally liquid hydrocarbon fuel and a (2) minor portion, sufficient to impart dispersancy, of an oil-soluble graft copolymer containing from about 0.5% to about 15% by weight of an N-vinyl pyrrolidone which is prepared by reacting under polymerizing conditions and in the presence of a free radical polymerization initiator, (1) an N-vinyl pyrrolidone and (2) an oil-soluble polymer of at least one monomeric alkyl acrylate or alkyl methacrylate, in which the alkyl group or groups are of sufficient size to insure solubility of the copolymer in a liquid petroleum product, the monomeric alkyl acrylate or alkyl methacrylate being polymerized to at least 90% conversions of monomer to polymer.

2. A composition according to claim 1 in which there is employed at least 0.1% and up to about 10% by weight of said graft copolymer in a lubricating oil.

3. A composition according to claim 1 in which there is employed at least 0.001% and up to 0.1% by weight of said graft copolymer in a hydrocarbon fuel.

References Cited

UNITED STATES PATENTS

| | | |
|---|---|---|
| 3,067,163 | 12/1962 | Bauer. |
| 3,087,875 | 4/1963 | Graham et al. ____ 260—885 XR |
| 3,142,664 | 7/1964 | Bauer. |
| 3,147,222 | 9/1964 | Bauer. |

FOREIGN PATENTS

| | | |
|---|---|---|
| 1,437,012 | 3/1966 | France. |

DANIEL E. WYMAN, Primary Examiner

W. J. SHINE, Assistant Examiner

U.S. Cl. X.R.

44—62, 63